(12) United States Patent
Koufaty et al.

(10) Patent No.: US 11,526,451 B2
(45) Date of Patent: Dec. 13, 2022

(54) SECURE ADDRESS TRANSLATION SERVICES USING BUNDLE ACCESS CONTROL

(71) Applicant: Intel Corporation, Santa Clara, CA (US)

(72) Inventors: David Koufaty, Portland, OR (US); Anna Trikalinou, Hillsboro, OR (US); Utkarsh Y. Kakaiya, Folsom, CA (US); Ravi Sahita, Portland, OR (US); Ramya Jayaram Masti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 17/131,974

(22) Filed: Dec. 23, 2020

(65) Prior Publication Data

US 2021/0173794 A1    Jun. 10, 2021

(51) Int. Cl.
*G06F 12/14* (2006.01)
*G06F 12/1009* (2016.01)
*G06F 12/1045* (2016.01)

(52) U.S. Cl.
CPC ...... *G06F 12/1441* (2013.01); *G06F 12/1009* (2013.01); *G06F 12/1054* (2013.01); *G06F 12/1063* (2013.01); *G06F 12/1458* (2013.01)

(58) Field of Classification Search
CPC ............. G06F 9/45558; G06F 12/0882; G06F 12/1009; G06F 12/1036; G06F 12/1054; G06F 12/1063; G06F 12/1081; G06F 12/1441; G06F 12/1458; G06F 12/1483; G06F 2209/45583; G06F 2212/1016; G06F 2212/1052; G06F 2212/151; G06F 2212/651; G06F 2212/657
See application file for complete search history.

(56) References Cited

U.S. PATENT DOCUMENTS

| | | | |
|---|---|---|---|
| 6,859,867 B1 * | 2/2005 | Berry ................. | G06F 12/1475 711/E12.095 |
| 6,968,434 B2 * | 11/2005 | Kamano ............. | G06F 12/1483 711/163 |
| 10,642,501 B1 * | 5/2020 | Patel .................. | G06F 12/1009 |

(Continued)

FOREIGN PATENT DOCUMENTS

| | | |
|---|---|---|
| CN | 114661638 A | 6/2022 |
| DE | 102021128529 A1 | 6/2022 |
| TW | 202225983 | 7/2022 |

*Primary Examiner* — Aracelis Ruiz
(74) *Attorney, Agent, or Firm* — Jaffery Watson Mendonsa & Hamilton LLP

(57) ABSTRACT

Embodiments are directed to providing a secure address translation service. An embodiment of a system includes a memory device to store memory data in a plurality of physical pages shared by a plurality of devices, a first table to map each page of memory to an associated bundle identifier (ID) that identifies one or more devices having access to a page of memory, a second table to map each bundle ID to page access permissions that define access to one or more pages associated with a bundle ID and a translation agent to receive requests from the plurality of devices to perform memory operations on the memory and determine page access permissions for requests received from the plurality of devices using the first table and the second table.

20 Claims, 11 Drawing Sheets

(56) References Cited

U.S. PATENT DOCUMENTS

| | | | |
|---|---|---|---|
| 2009/0113141 A1* | 4/2009 | Bullman | G06F 12/1483 |
| | | | 711/147 |
| 2013/0080726 A1* | 3/2013 | Kegel | G06F 12/1491 |
| | | | 711/163 |
| 2014/0331019 A1* | 11/2014 | Parker | G06F 12/1458 |
| | | | 711/163 |
| 2018/0032449 A1* | 2/2018 | Mukunan | G06F 12/1483 |
| 2021/0173794 A1 | 6/2021 | Koufaty et al. | |
| 2021/0318812 A1* | 10/2021 | Lidman | G06F 12/1475 |

* cited by examiner

FIG. 3B

Add(HPA, Tenant)

Curr_BID = BIT[HPA]

New_list_of_sharers = existing_sharers_for_Curr_BID + tenant

New_BID = Change_BID(HPA, New_list_of_sharers)

For each device that is used by Tenant

Increment device ref count for HPA

If BIP[New_BID] is not set

Set BIP[New_BID]

FIG. 7

```
Remove(HPA, Tenant)
    For each device that was used by Tenant
        Decrement device ref count for HPA
        If device ref count for HPA is 0
            Curr_BID = BIT[HPA]
            If number of pages in Curr_BID is 1
                // there was only one page in Curr_BID and no more references to it
                // from this device, so we can clear it
                Clear device BIP[Curr_BID]
            else
                // we have some other pages in Curr_BID that device can still access
                // but HPA has to move to a New_BID (accessible to all devices that
                // had access to Curr_BID)
                // this can be optimized to do it after we find all devices that no longer
                // have access to HPA
                New_list_of_sharers = existing_sharers_for_Curr_BID - tenant
                New_BID = Change_BID(HPA, New_list_of_sharers)
                For each device
                    If device ref count for HPA is > 0
                        Set BIP[NewBID]
        else
            // do nothing, at least one other mapping from this or other tenants has access to page
```

FIG. 8

```
Change_BID (HPA, New_list_of_sharers)

Curr_BID = BIT[HPA]

New BID = find BID consisting of New_list_of_tenants

Decrement number of pages in Curr_BID

Increment number of pages in New_BID

Set BIT[HPA] = New_BID

Return New_BID
```

FIG. 9

SECURE ADDRESS TRANSLATION SERVICES USING BUNDLE ACCESS CONTROL

TECHNICAL FIELD

Embodiments described herein generally relate to the field of memory address translation and memory protection and, more particularly to a translation agent (e.g., an input/output memory management unit (IOMMU)) providing a secure address translation service based on a context of a requesting device.

BACKGROUND

Most modern computer systems use memory virtualization for optimal memory usage and security. Traditionally, Peripheral Component Interconnect Express (PCIe) devices would only observe untranslated addresses instead of a Host Physical Addresses (HPA), and would send a read or write request with a given untranslated address. On the host side, the processor's IOMMU would receive a read/write request from a device, translate the specified address to an HPA and complete the device's memory access (read/write). In order to isolate devices only to specific addresses, software would program the device and the IOMMU to use untranslated address that are, for example, a Virtual Addresses (VA) or an Input/Output Virtual Address (IOVA). The HPA is the physical address used to access all platform resources, after all address translations have taken place, including any translation from Guest Physical Address (GPA) to HPA in a virtualized environment, and it is usually referred simply as a Physical Address (PA) in a non-virtualized environment.

Address Translation Services (ATS) is an extension to the PCIe protocol. The current version of ATS is part of the PCIe specification, currently 4.0, which is maintained by the PCI Special Interest Group (PCI-SIG) and which can be accessed by members at https://pcisig.com/specifications/ may be referred to herein as the "ATS Specification." ATS among other things, allows devices to cache address translations and to handle page faults (traditional PCIe devices required memory pinning), which facilitates support for a variety of performance features, including Device Translation Lookaside Buffer (Dev-TLB) and Shared Virtual Memory. ATS also provides support for cache-coherent links like Computer Express Link (CXL) that operate exclusively on physical address. ATS allows a PCIe device to request address translations, from VA to HPA, from a translation agent (e.g., the IOMMU). This capability allows the device to store the resulting translations internally in a Dev-TLB, also referred to by the ATS Specification as an address translation cache (ATC), and directly use the resulting HPA to subsequently access main memory, via a host-to-device link (e.g., a PCIe interface or a cache-coherent interface (e.g., CXL, NVLink, and Cache Coherent Interconnect for Accelerators (CCIX)). As such, ATS splits a legacy PCIe memory access into multiple stages, including (i) a Translation Request in which the device requests a translation for a VA to a HPA; (ii) a Translated Request in which the device requests a read/write with a given HPA; and (iii) an optional Page Request in which the device makes a request to the IOMMU for a new page to be allocated for it after a failed Translation Request.

At present, ATS performs limited security checks on translation requests and translated requests, but these checks are insufficient to protect against a malicious ATS device.

BRIEF DESCRIPTION OF THE DRAWINGS

Embodiments described here are illustrated by way of example, and not by way of limitation, in the figures of the accompanying drawings in which like reference numerals refer to similar elements.

FIG. 3B illustrates one embodiment of a bundle identifier table.

FIG. 7 illustrates one embodiment of pseudocode for adding a page to a tenant's domain.

FIG. 8 illustrates one embodiment of pseudocode for removing a page from a tenant's domain.

FIG. 9 illustrates one embodiment of pseudocode for changing a bundle identifier.

DETAILED DESCRIPTION

Figure 1:
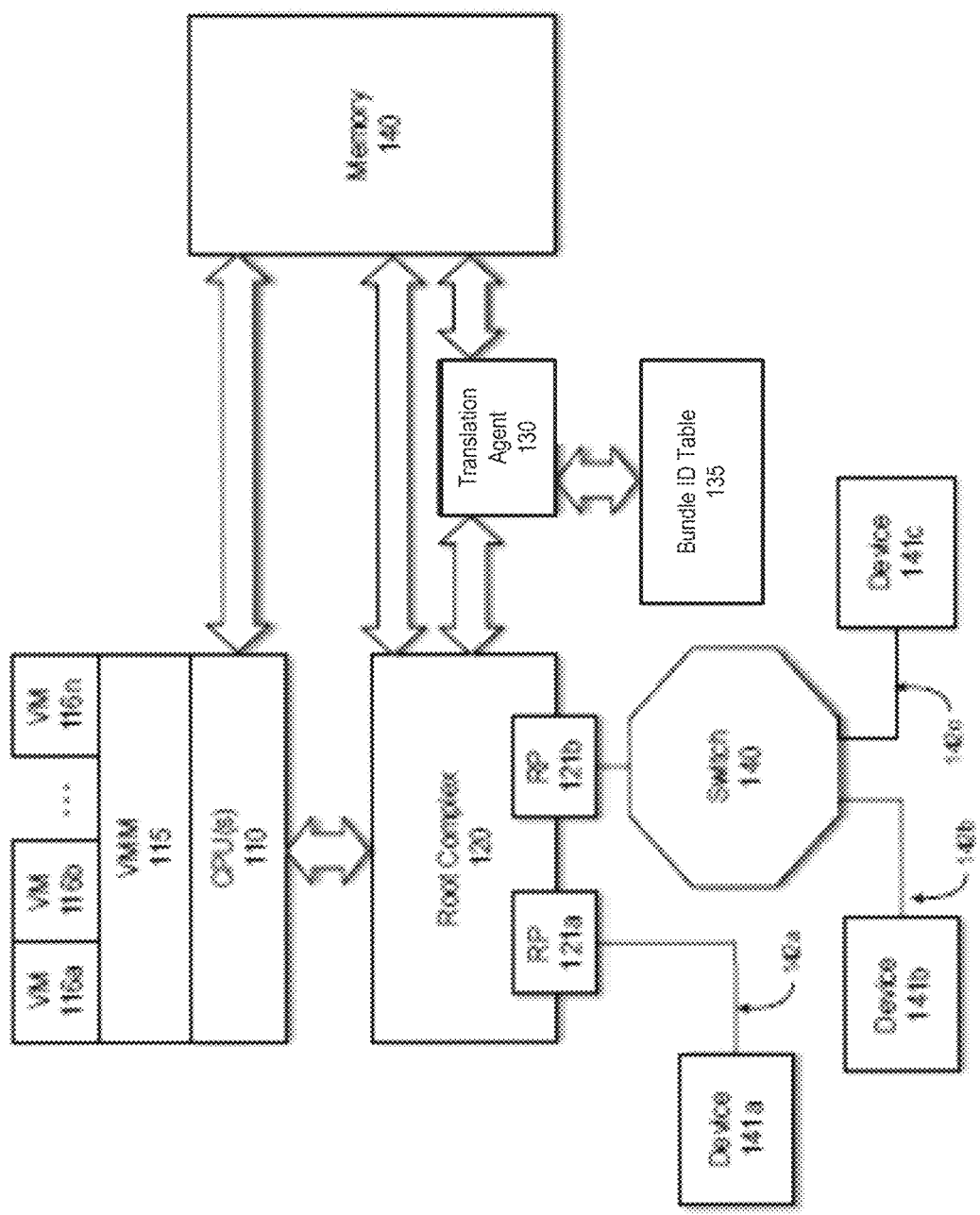
FIG. 1 is a block diagram illustrating a computing system architecture including a host system and associated integrated and/or discrete devices in accordance with an embodiment.

Embodiments described herein are directed to providing a secure address translation service by a translation agent based on a context of a requesting device.

The ATS Specification provides checks on every ATS Translated Request with an HPA to verify (i) the device that sent the memory access request is enabled by the system software to use ATS; and (ii) the HPA is not part of a system protected range (e.g., an Intel® Software Guard Extensions (SGX) Protected Memory Range (PRMRR) region). While these checks allow the system software to check the device manufacturer of the device before allowing a requested memory operation and to verify that highly-sensitive system regions are protected from an ATS device, all other memory (e.g., ring−1, ring 0, ring 3 code/data) remains vulnerable and without device authentication, device manufacturer information can be easily forged by an attacker. In addition, device authentication cannot guarantee the proper behavior of a device (e.g., a Field Programmable Gate Array (FPGA)) with reconfigurable hardware logic. Therefore, those skilled in the art will recognize the current ATS definition has a security vulnerability. Specifically, a malicious ATS device can send a Translated Request with an arbitrary HPA and perform a read/write to that HPA, without first asking for a translation or permission from the trusted system, such as the IOMMU.

Another layer of protection provided by modern processors may include an architecture and instruction set architecture (ISA) extensions, which includes per-domain encryption keys. A domain can be a Virtual Machine (VM) running inside a Virtual Machine Monitor (VMM). However, if ATS is enabled, a malicious ATS device that is not trusted by any domain, can still write to any HPA with the wrong key, which can result in memory corruption and/or be used as part of a Denial of Service attack on a domain.

Meanwhile, if the domain chooses to disable ATS for a particular device, then that particular device would be incompatible with cache-coherent links and would be incompatible with other host performance features like Shared Virtual Memory and VMM Overcommit. As such, without the improvements described herein, software vendors would be faced with a choice between performance and security.

Embodiments described herein generally seek to provide an access control mechanism so that a device can only access HPAs that were explicitly assigned to a context of the device initiating a memory operation at issue. For example, such access control ensures that a device is only be able to read/write memory (on behalf of a bus, a port, a process, a function or itself) to which the system software has explicitly granted access. Various embodiments described herein are based on adding new bundle identifier (BID) permission (BIP) structure and a bundle identifier table (BIT), which may be used by a translation agent to validate device requests to translate a VA to an HPA. In order to be consistent with the ATS Specification, these upstream requests initiated by a context of a device may be referred to individually herein as a "translation request." Similarly, an upstream request initiated by a context of a device to perform a memory operation with reference to a specified HPA may be referred to herein as a "translated request." As used herein the phrases a "context of" or "context on" a device generally refers to a bus to which the device is coupled, a process executing on the device, a function or virtual function being executed by the device or the device itself.

At a high level, physical pages are grouped into bundles. In such embodiments, physical pages belonging to (or associated with) a first tenant (e.g., tenant A) are be assigned to a first bundle identifier (or ID) (e.g., Bundle ID1). In further embodiments, a global table (or Bundle ID Table (BIT)) is generated that maps each physical page to an associated Bundle ID. In this embodiment, the BIT is a single table per system that is indexed with a HPA. In yet a further embodiment, a per-device/per-tenant structure (or Bundle ID Permission (BIP)) is generated that maintains the Bundle IDs that a device is permitted to access. For instance, an ATS device used by tenant A is permitted to access Bundle ID1. Moreover, the table size of a BIP is proportional to the number of Bundle IDs supported.

FIG. 1 is a block diagram illustrating a computing system architecture 100 including a host system and associated integrated and/or discrete devices 141a-c in accordance with an embodiment. In the context of the present example, the host system includes one or more central processing units (CPUs) 110, a root complex (RC) 120 and a memory 140. Similar to a host bridge in a PCI system, the RC 120 generates transaction requests on behalf of the CPUs 110, which are coupled to the RC 120 through a local bus and facilitates processing of requests by devices 141a-c, which are coupled to the RC 120 via respective host-to-device links 142a-c, and root port (RP) 121a or switch 140 and RP 121b. Depending on the particular implementation, RC functionality may be implemented as a discrete device, or may be integrated with a processor.

ATS uses a request-completion protocol between devices 141a-c and the RC 120 to provide translation services. Non-limiting examples of devices 141a-c include a network interface card (NIC), a graphics processing unit (GPU), a storage controller, an audio card, and a solid-state drive (SSD) in the form of a peripheral (auxiliary) device or an integrated device. The basic flow of an ATS request (e.g., a translation request or a translated request) begins with a context (e.g., a process or a function) of a device (e.g., one of devices 141a-c) determining through an implementation-specific method that caching a translation within the device's address translation cache (ATC) (not shown), for example, would be beneficial. The context (not shown) generates a translation request, which is sent upstream through the PCIe hierarchy (via host-to-device link 142b or 142c, switch 140, and RP 121b or via host-to device link 142a and RP 121a, depending upon the device 141a-c with which the context is associated) to the RC 120, which then forwards the request to translation agent 130. Non-limiting examples of host-to-device link 142a-c include a PCIe link or a cache-coherent link (e.g., CXL) that includes PCIe capabilities. When the translation agent 130 has completed processing associated with the ATS request, the translation agent 130 communicates the success or failure of the request to the RC 120, which generates an ATS completion and transmits it to the requesting device via the associated RP 121a or 121b.

As noted above, in accordance with the ATS Specification, translation agents perform various checks to among other things, validate the requesting device has been enabled by the system software to use ATS and that the HPA specified by a translated request is not part of a system protected range. In addition to these checks, which are insufficient to protect against a malicious ATS device, in various embodiments, the translation agent 130 provides an access control mechanism that ensures a context of a device can only access HPAs to which it has explicitly been assigned appropriate permissions.

In one embodiment, system software (e.g., the operating system (not shown), virtual machine manager (VMM) 115 and/or virtual machines 116a-n) running on the host system can configure permissions (e.g., read and/or write access) for each page of memory 140 individually for each of devices 141a-c. These permissions (may be referred to herein as page access permissions, page permissions, BIT page access permissions and/or BIT page permissions) may be maintained on behalf of system software by the translation agent 130 in a BIT 135. The BIT 135 or portions thereof may be stored in a variety of locations including, but not limited to on-chip memory (e.g., static random access memory (SRAM)), off-chip memory (e.g., DRAM), registers or an external storage device (not shown). In a further embodiment, devices 141a-c are associated with one or more tenants of the host system. As used herein, a tenant may be defined as a user that shares access to the resources of the host system.

Depending upon the particular implementation, the BIT 135 could be represented as a flat table in memory 140 in which for every device associated with the host system that is desired to use secure ATS and for each page in main memory a corresponding permission entry containing page access permissions specifying appropriate read/write permissions can be created. Alternatively, in order to avoid pre-allocating a large memory space and take advantage of the small size of the permission entries, the BIT 135 can be organized as a hierarchical table (similar to how address translation page tables are organized) as described further below. In any implementations in which the BIT 135 is stored off-chip, one or more optional, dedicated BIT caches 131 may be used to accelerate walking of the various levels of the BIT 135.

The computing system architecture 100 may include additional components as provided in the computing system illustrated in FIG. 10 discussed below.

Figure 2:
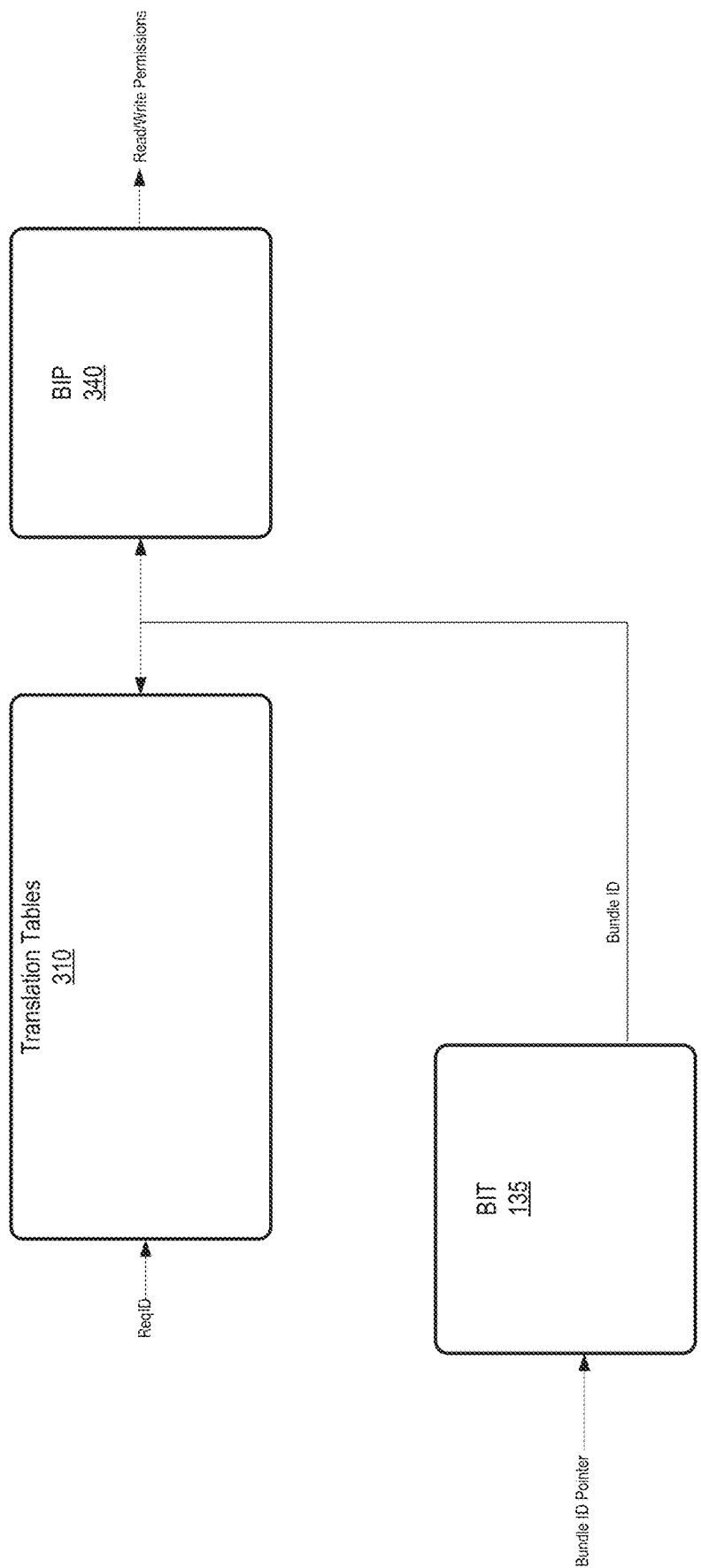
FIG. 2 is a block diagram illustrating one embodiment of a translation agent.

FIG. 2 is a block diagram illustrating one embodiment of a translation agent 130. As shown in FIG. 2, translation agent 130 includes translation tables 310. In one embodiment, translation tables 310 receives a Requestor Identifier (ReqID) in a device transaction that is used to determine whether a device is allowed to issue an ATS prior to performing a memory transaction. In such an embodiment, the ReqID includes Bus, Device, Function (BDF) that sent the request, the HPA to be accessed and an indication whether the request is a read or write request. Additionally, the ReqID may include a Process Address Space Identifier (PASID) of a process that is to perform the memory transaction.

Additionally, translation agent 130 includes BIT 135 and BIP 340. BIT 135 receives a Bundle ID pointer (e.g., a HPA) that is implemented to lookup (e.g., while the translation tables 310 are being looked up) a Bundle ID that is associated with a physical page that the device requested to access. The Bundle ID is then used as an index to find a BIP entry that includes the PASID Read/Write permissions for that Bundle ID. Table 1 illustrates one embodiment of a BIP entry format.

TABLE 1

| 1 | 0 |
|---|---|
| Write | Read |

Figure 3A:
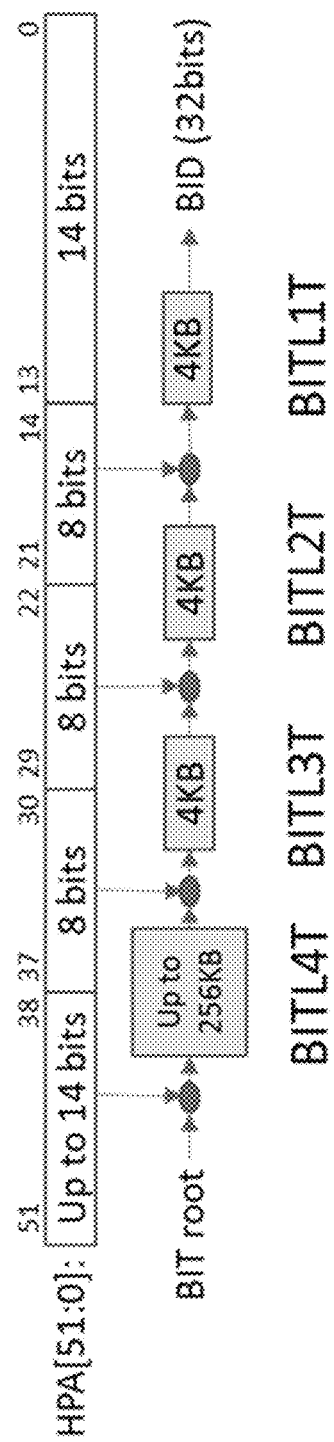
FIG. 3A illustrates one embodiment of a mapping using a multi-level bundle identifier table.
Figure 3B:
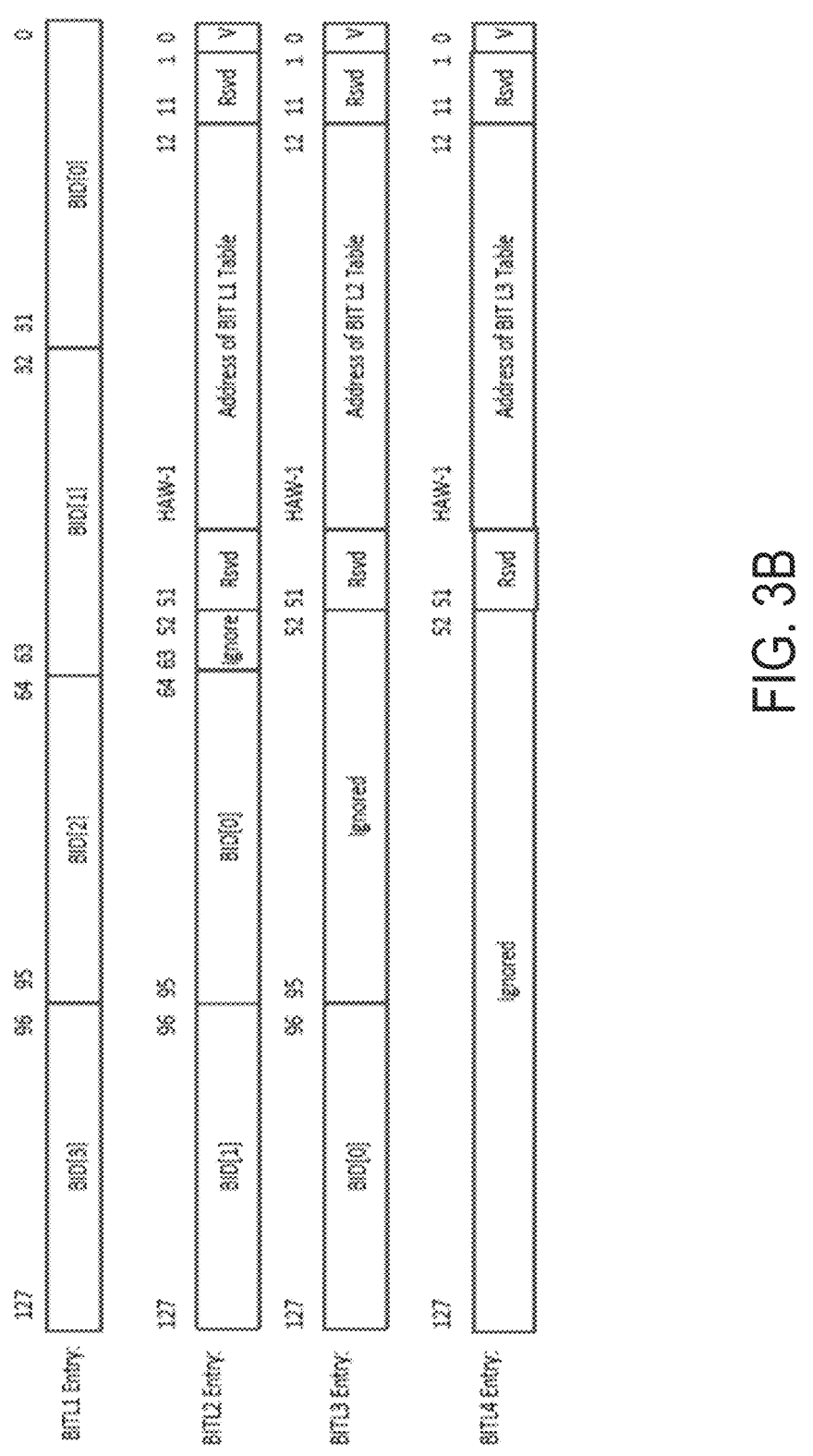

As discussed above, BIT 135 maps physical pages to associated Bundle IDs, and is indexed with Host Physical Address. FIG. 3A illustrates one embodiment of a mapping using a multi-level BIT, while FIG. 3B illustrates one embodiment of entry formats for each level. As shown, BIT 135 can be more tightly packed than regular page tables since each BID is smaller than a regular page table entry (e.g., 32-bit BID vs 64-bit for leaf entry of many existing page table formats). Thus, twice as many BIDs may be packed in a single cache line. In one embodiment, new caches may be included for each BIT level, in order to accelerate the BIT walk.

As previously mentioned, the BIP 340 structure maps Bundle IDs to permissions that define device access to one or more pages (e.g., whether a device is allowed to Read or Write) associated with a Bundle ID. According to one embodiment, BIP per-tenant or per-device man be configured (e.g., via software) depending on software usage and device capability to support sending PASID information on every PCIe ATS Translated Request. Accordingly, all tenants that share a device will share a common BIP (e.g., for devices that support multitenancy via a model such as Scalable IO Virtualization).

Figure 4:
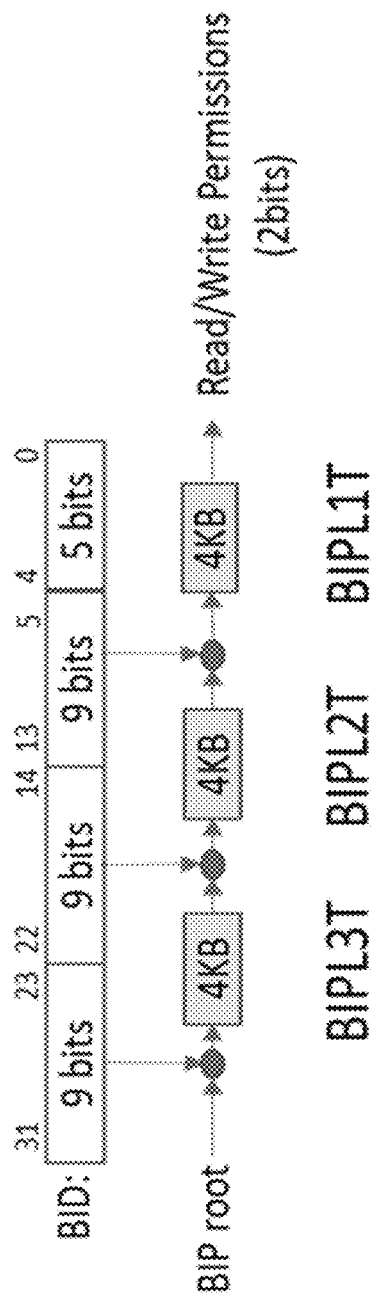
FIG. 4 illustrates one embodiment of a mapping of bundle identifiers to multi-level bundle identifier permissions.

FIG. 4 illustrates one embodiment of a bundle identifier table mapping for 32-bit BID. Additionally, illustrates one embodiment of a 3-level BIP hierarchy implementing the mapping shown in FIG. 4. In the worst case, a three-level BIP uses three extra memory reads (in addition to the BIT memory loads).

In an alternative embodiment, BIP 340 may include allowing each PASID to access one BID at a time. In such an embodiment, the BID may be stored in a PASID Table Entry in translation tables 310 to eliminate the need for additional memory reads.

Figure 5:
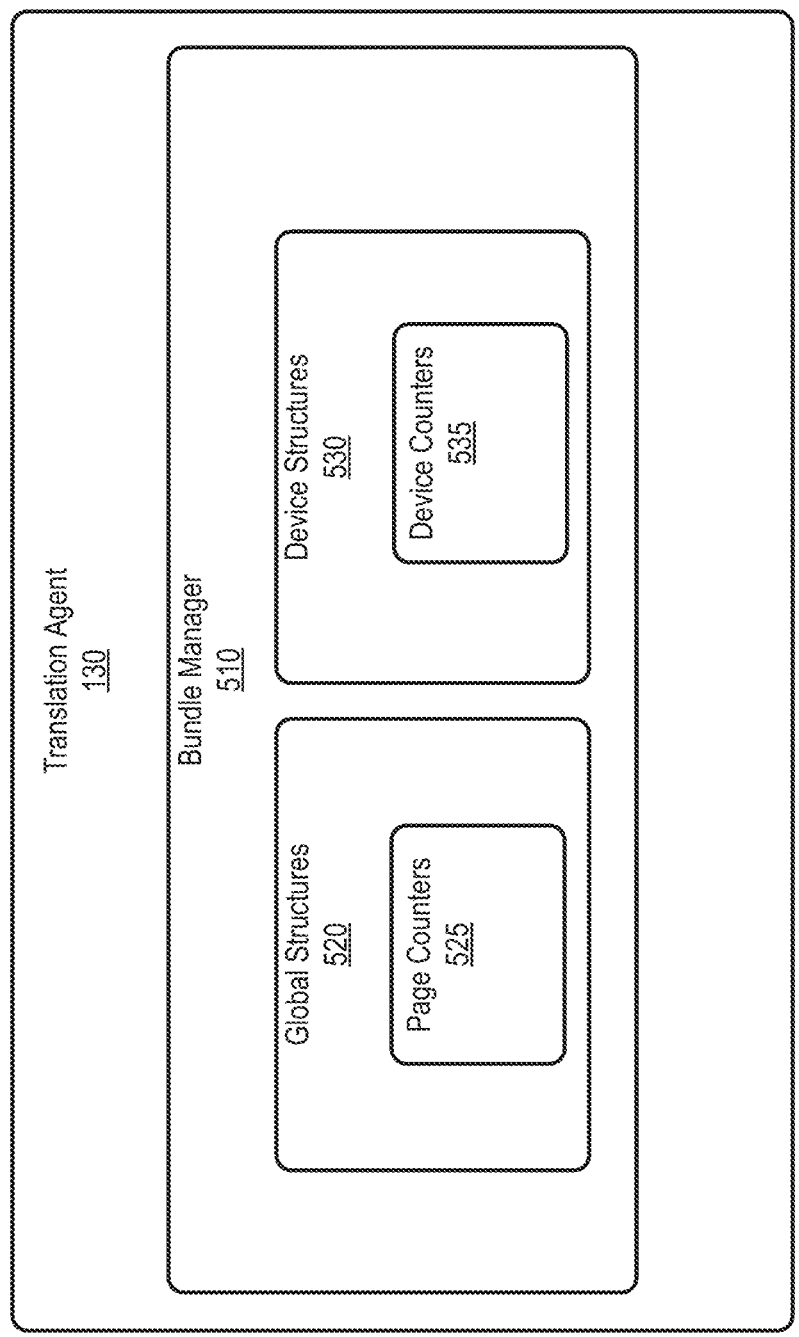
FIG. 5 illustrates another embodiment of a translation agent.

In one embodiment, translation agent 130 also includes a bundle manager to manage the BIT 135 and BIP 340. FIG. 5 illustrates another embodiment of a translation agent 130 including a bundle manager 510. As shown in FIG. 5, bundle manager 510 includes global structures 520 and device structures 530. In one embodiment, global structures comprise page reference counters 525 associated with each physical page. In such an embodiment, each page counter 525 tracks a magnitude of the guest physical addresses that reference each physical page. Global structures 520 may also include a number of pages assigned to each Bundle ID, tenant to BID mappings (e.g., a list of the BIDs that a given tenant can access) and BID to tenant mappings (e.g., a list of the tenants that can access a given BID). Device structures includes device reference counters 535 that tracks a per-device reference count. In one embodiment, device counters 535 track a magnitude of the guest virtual addresses of the tenants that can access a particular device that references each physical page.

Figure 6:
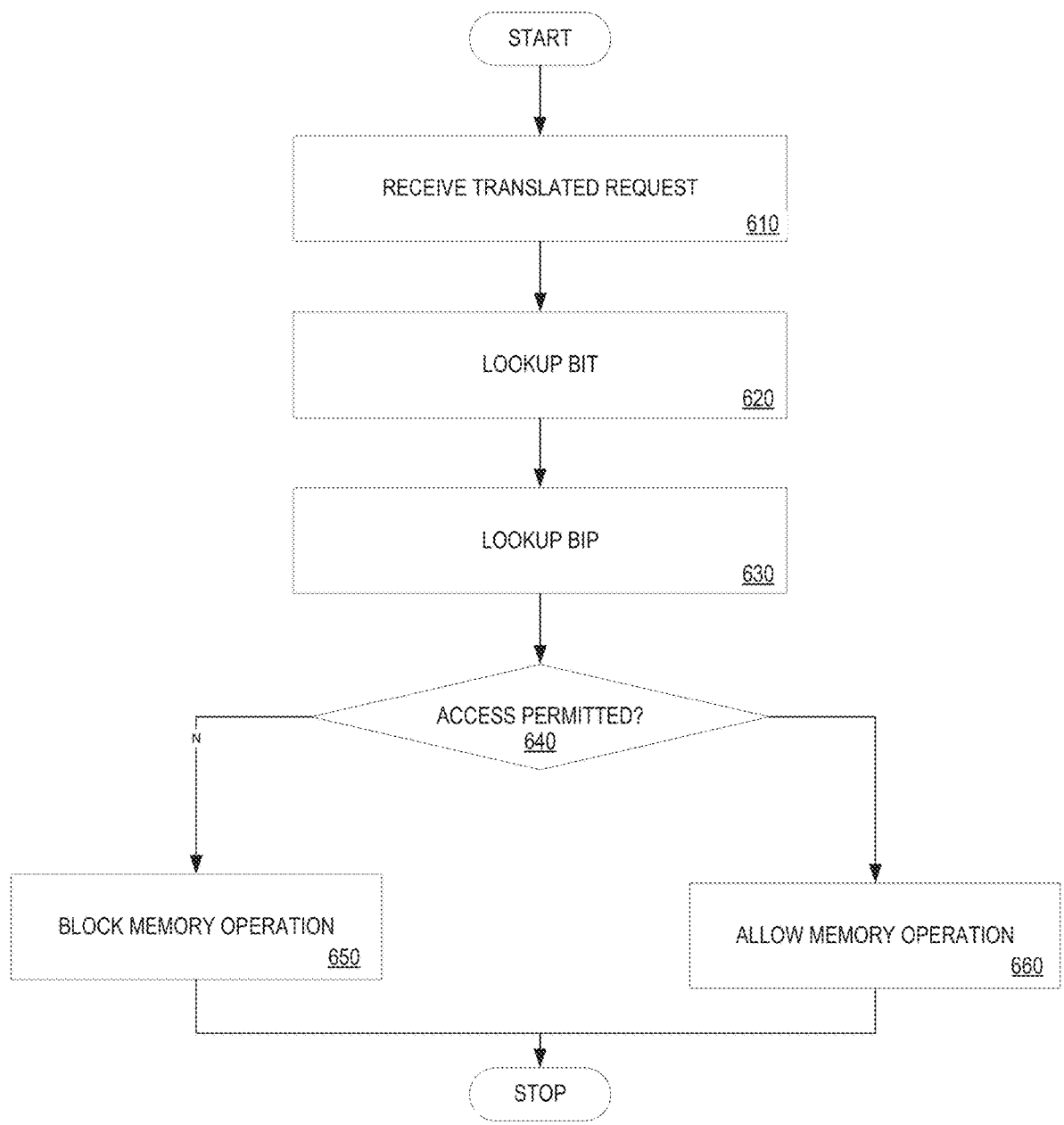
FIG. 6 is a flow diagram illustrating one embodiment of a process performed by a translation agent.

FIG. 6 is a flow diagram illustrating one embodiment of a process performed by a translation agent. At processing block 610, an address translation request is received. As discussed above, the address translation request includes a ReqID, an HPA that is to be accessed as well as a requested memory operation (e.g., Read/Write request). At processing block 620, the BIT is searched using the HPA included in the address translation request to find a Bundle ID associated with the HPA. As discussed above, the BIT search is performed in parallel with the search of the translation tables.

At processing block 630, the Bundle ID is used to search the BIP to find a permissions entry associated with the Bundle ID. In one embodiment, this process only occurs upon a determination (e.g., via the translation tables) that the address translation request is permitted. At decision block 640, the BIP entry is examined to determine whether determination is made as to whether the permissions indicate that memory operation included in the request is permitted. If not, the memory operation is blocked, processing block 650. Otherwise the memory operation is allowed, processing block 660.

As discussed above, a tenant that does not share one or more physical pages with other tenants is a assigned a single Bundle ID. As a result, every physical page that belongs to the tenant is marked with the associated Bundle ID in BIT 135, and every device that is used by the tenant has Read and Write permission for that Bundle ID. However, if a tenant shares pages with another tenant (e.g., via explicit sharing or via implicit memory deduplication), those shared pages need to be marked with a different Bundle ID. Table 3 illustrates one embodiment of Bundle ID assignment for pages that are accessible by a combination of tenants.

TABLE 2

| Level | Table Size | Entry Size | Entries | Index Bits | Offset Bits | Coverage |
|---|---|---|---|---|---|---|
| BIPL1 | 4 KB | 64 b | 512 | 13:5 | 4:0 | 32 |
| BIPL2 | 4 KB | 64 b | 512 | 22:14 | N/A | 1 |
| BIPL3 | 4 KB | 64 b | 512 | 31:23 | N/A | 1 |

TABLE 3

| Bundle ID | Accessible by | | |
|---|---|---|---|
| | Tenant A | Tenant B | Tenant C |
| 1 | X | | |
| 2 | | X | |
| 3 | | | X |

TABLE 3-continued

| Bundle ID | Accessible by | | |
|---|---|---|---|
| | Tenant A | Tenant B | Tenant C |
| 4 | X | X | |
| 5 | X | | X |
| ... | | | |

According to one embodiment, a shared tuple includes a unique Bundle ID. Thus, both BIT size and BIT size depend on the level of sharing between the tenants. As an example, when sharing between tenants is infrequent, a smaller size Bundle ID can be supported (e.g., 16-bit Bundle ID ($2^{16}$=65,536 unique Bundle IDs)). However, if sharing is frequent, then a larger size Bundle ID is more suitable (e.g., 32-bit Bundle ID ($2^{32}$=~4.3 billion unique Bundle IDs)).

In a further embodiment, pages may be added to, or removed from, a tenant's domain. To add a page to a tenant's domain, a device reference count is incremented and a new BIP entry is set if one does not already exist. FIG. 7 illustrates one embodiment of pseudocode for adding a page to a tenant's domain. To remove a page from a tenant's domain, the device reference count for a HPA is decremented for each device that was used by the tenant. Subsequently, the current BID can be cleared for each device in which it is determined that there are no additional pages in the current BIP that is reference by the device. Otherwise, the current BID is changed to a new BID having the remaining pages that are referenced by the device. FIG. 8 illustrates one embodiment of pseudocode for removing a page from a tenant's domain, while FIG. 9 illustrates one embodiment of pseudocode for changing the BID.

Figure 10:
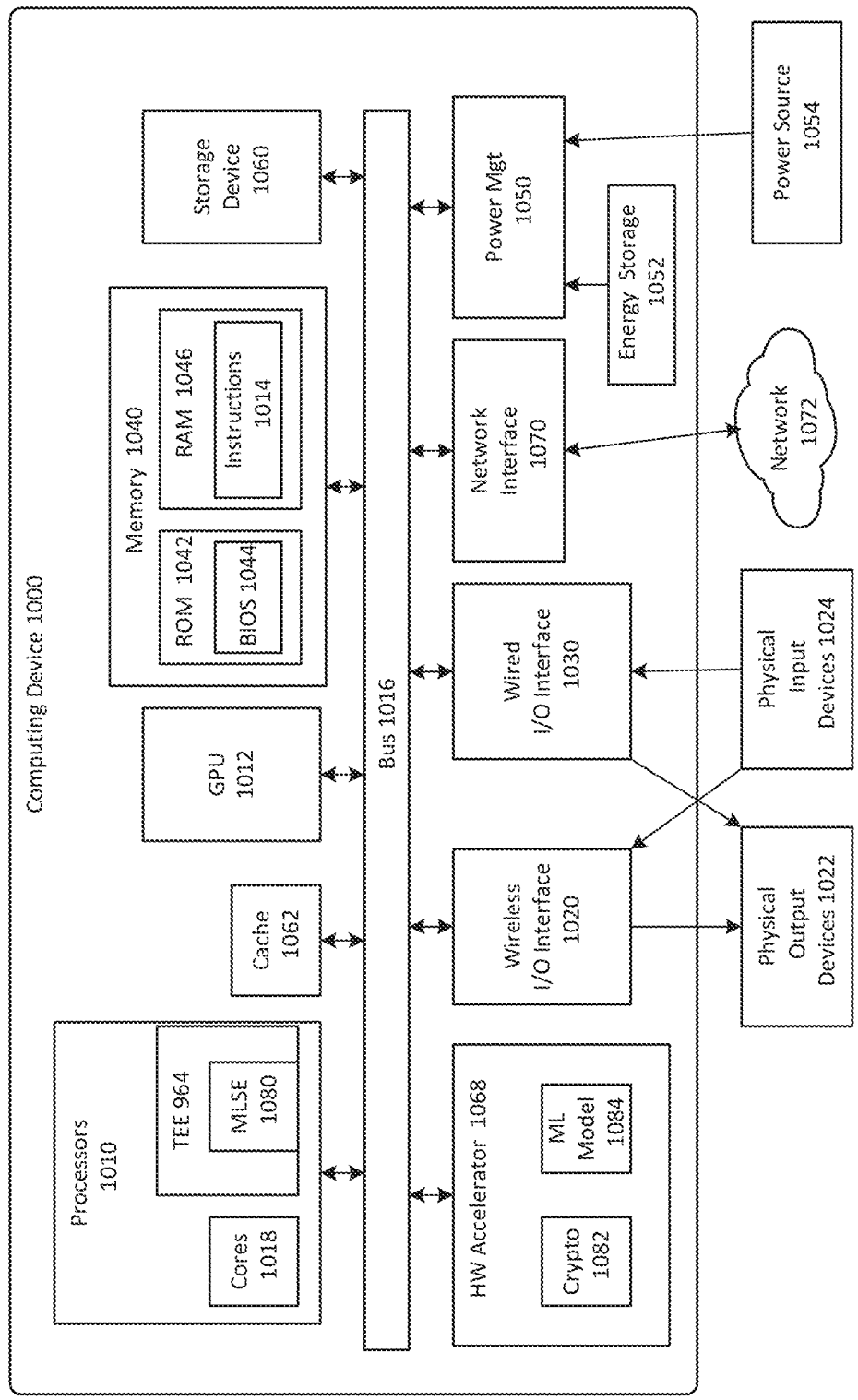
FIG. 10 illustrates one embodiment of a schematic diagram of an illustrative electronic computing device.

FIG. 10 is a schematic diagram of an illustrative electronic computing device to enable enhanced protection against adversarial attacks according to some embodiments. In some embodiments, the computing device 1000 includes one or more processors 1010 including one or more processors cores 1018 and a Trusted Execution Environment (TEE) 1064, the TEE including a machine learning service enclave (MLSE) 1080. In some embodiments, the computing device 1000 includes a hardware accelerator (HW) 1068, the hardware accelerator including a cryptographic engine 1082 and a machine learning model 1084. In some embodiments, the computing device is to provide enhanced protections against ML adversarial attacks, as provided in FIGS. 1-9.

The computing device 1000 may additionally include one or more of the following: cache 1062, a graphical processing unit (GPU) 1012 (which may be the hardware accelerator in some implementations), a wireless input/output (I/O) interface 1020, a wired I/O interface 1030, memory circuitry 1040, power management circuitry 1050, non-transitory storage device 1060, and a network interface 1070 for connection to a network 1072. The following discussion provides a brief, general description of the components forming the illustrative computing device 1000. Example, non-limiting computing devices 1000 may include a desktop computing device, blade server device, workstation, or similar device or system.

In embodiments, the processor cores 1018 are capable of executing machine-readable instruction sets 1014, reading data and/or instruction sets 1014 from one or more storage devices 1060 and writing data to the one or more storage devices 1060. Those skilled in the relevant art will appreciate that the illustrated embodiments as well as other embodiments may be practiced with other processor-based device configurations, including portable electronic or hand-held electronic devices, for instance smartphones, portable computers, wearable computers, consumer electronics, personal computers ("PCs"), network PCs, minicomputers, server blades, mainframe computers, and the like.

The processor cores 1018 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1000 includes a bus or similar communications link 1016 that communicably couples and facilitates the exchange of information and/or data between various system components including the processor cores 1018, the cache 1062, the graphics processor circuitry 1012, one or more wireless I/O interfaces 1020, one or more wired I/O interfaces 1030, one or more storage devices 1060, and/or one or more network interfaces 1070. The computing device 1000 may be referred to in the singular herein, but this is not intended to limit the embodiments to a single computing device 1000, since in certain embodiments, there may be more than one computing device 1000 that incorporates, includes, or contains any number of communicably coupled, collocated, or remote networked circuits or devices.

The processor cores 1018 may include any number, type, or combination of currently available or future developed devices capable of executing machine-readable instruction sets.

The processor cores 1018 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks need not be described in further detail herein, as they will be understood by those skilled in the relevant art. The bus 1016 that interconnects at least some of the components of the computing device 1000 may employ any currently available or future developed serial or parallel bus structures or architectures.

The system memory 1040 may include read-only memory ("ROM") 1042 and random access memory ("RAM") 1046. A portion of the ROM 1042 may be used to store or otherwise retain a basic input/output system ("BIOS") 1044. The BIOS 1044 provides basic functionality to the computing device 1000, for example by causing the processor cores 1018 to load and/or execute one or more machine-readable instruction sets 1014. In embodiments, at least some of the one or more machine-readable instruction sets 1014 cause at least a portion of the processor cores 1018 to provide, create, produce, transition, and/or function as a dedicated, specific, and particular machine, for example a word processing machine, a digital image acquisition machine, a media playing machine, a gaming system, a communications device, a smartphone, or similar.

The computing device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The computing device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include, but are not limited to: universal serial bus (USB), IEEE 1394 ("FireWire"), and similar.

The computing device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the computing device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor cores 1018 and/or graphics processor circuitry 1012 and/or one or more applications executed on or by the processor cores 1018 and/or graphics processor circuitry 1012. In some instances, one or more data storage devices 1060 may be communicably coupled to the processor cores 1018, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or Wi-Fi®, etc.).

Processor-readable instruction sets 1014 and other programs, applications, logic sets, and/or modules may be stored in whole or in part in the system memory 1040. Such instruction sets 1014 may be transferred, in whole or in part, from the one or more data storage devices 1060. The instruction sets 1014 may be loaded, stored, or otherwise retained in system memory 1040, in whole or in part, during execution by the processor cores 1018 and/or graphics processor circuitry 1012.

The computing device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the computing device 1000. The power source 1054 may include, but is not limited to, a solar power system, a commercial electric grid, a portable generator, an external energy storage device, or any combination thereof.

For convenience, the processor cores 1018, the graphics processor circuitry 1012, the wireless I/O interface 1020, the wired I/O interface 1030, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 1018 and/or the graphics processor circuitry 1012. In some embodiments, all or a portion of the bus 1016 may be omitted and the components are coupled directly to each other using suitable wired or wireless connections.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate security of a shared memory resource, comprising a memory device to store memory data in a plurality of physical pages shared by a plurality of devices, a first table to map each page of memory to an associated bundle identifier (ID) that identifies one or more devices having access to a page of memory, a second table to map each bundle ID to page access permissions that define access to one or more pages associated with a bundle ID and a translation agent to receive requests from the plurality of devices to perform memory operations on the memory and determine page access permissions for requests received from the plurality of devices using the first table and the second table.

Example 2 includes the subject matter of Example 1, wherein the translation agent receives a first request to perform a memory operation from a first of the plurality of devices and performs a lookup of the first table using a host physical address (HPA) associated with a first page of memory included in the first request to find a bundle ID associated with the HPA.

Example 3 includes the subject matter of Examples 1-2, wherein the translation agent performs a lookup of the second table using the bundle ID to determine page access permissions associated with the bundle ID.

Example 4 includes the subject matter of Examples 1-3, wherein the translation agent allows the memory operation to proceed upon a determination that the page access permissions associated with the bundle ID indicates that the memory operation is permitted.

Example 5 includes the subject matter of Examples 1-4, wherein the translation agent blocks the memory operation upon a determination that the page access permissions associated with the bundle ID indicates that the memory operation is not permitted.

Example 6 includes the subject matter of Examples 1-5, further comprising translation tables.

Example 7 includes the subject matter of Examples 1-6, wherein the translation agent uses the translation tables to validate the first request.

Example 8 includes the subject matter of Examples 1-7, wherein the translation agent validates the first request while performs the lookup of the first table.

Example 9 includes the subject matter of Examples 1-8, wherein the translation agent further comprises global page reference counters associated with each page of memory to track a magnitude of guest virtual addresses that reference each page.

Example 10 includes the subject matter of Examples 1-9, wherein the translation agent further comprises a structure comprising a number of pages of memory assigned to each Bundle ID.

Example 11 includes the subject matter of Examples 1-10, wherein the translation agent further comprises a structure comprising a list of the Bundle ID that each of a plurality of tenants may access.

Example 12 includes the subject matter of Examples 1-11, wherein the translation agent further comprises device reference counters to track a magnitude of guest virtual addresses of tenants that can access each of the plurality of devices.

Some embodiments pertain to Example 13 that includes a method to facilitate security of a shared memory resource, comprising receiving a request to perform a memory operation from a first of a plurality of devices, performing a lookup of a first table using a host physical address (HPA) associated with a first page of memory included in the first request to find a bundle ID associated with the HPA and performing a lookup of a second table using the bundle ID to determine page access permissions associated with the bundle ID.

Example 14 includes the subject matter of Example 13, further comprising allowing the memory operation to proceed upon a determination that the page access permissions associated with the bundle ID indicates that the memory operation is permitted.

Example 15 includes the subject matter of Examples 13 and 14, further comprising blocking the memory operation upon a determination that the page access permissions associated with the bundle ID indicates that the memory operation is not permitted.

Example 16 includes the subject matter of Examples 13-15, further comprising validating the request via translation tables while performing the lookup of the first table.

Some embodiments pertain to Example 17 that includes a t least one computer-readable medium having instructions, which when executed by a processor, causes the processor to receive a request to perform a memory operation from a first of a plurality of devices, perform a lookup of a first table using a host physical address (HPA) associated with a first page of memory included in the first request to find a bundle ID associated with the HPA and perform a lookup of a second table using the bundle ID to determine page access permissions associated with the bundle ID.

Example 18 includes the subject matter of Example 17, having instructions, which when executed by a processor, further causes the processor to allow the memory operation to proceed upon a determination that the page access permissions associated with the bundle ID indicates that the memory operation is permitted.

Example 19 includes the subject matter of Examples 17 and 18, having instructions, which when executed by a processor, further causes the processor to block the memory operation upon a determination that the page access permissions associated with the bundle ID indicates that the memory operation is not permitted.

Example 20 includes the subject matter of Examples 17-19, having instructions, which when executed by a processor, further causes the processor to validate the request via translation tables while performing the lookup of the first table.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
a memory device to store memory data in a plurality of physical pages shared by a plurality of devices; and
an input output memory management unit (IOMMU) to receive requests from the plurality of devices to perform memory operations on the memory and determine page access permissions for the requests received from the plurality of devices using a first table to map each physical page of memory to an associated bundle identifier (ID) that identifies one or more devices having access to a page of memory and using the bundle ID to index a second table that maps each bundle ID to page access permissions that define access to one or more pages associated with a bundle ID.

2. The apparatus of claim 1, wherein the IOMMU receives a first request to perform a memory operation from a first of the plurality of devices and performs a lookup of the first table using a host physical address (HPA) associated with a first page of memory included in the first request to find a bundle ID associated with the HPA.

3. The apparatus of claim 2, wherein the IOMMU performs a lookup of the second table using the bundle ID to determine page access permissions associated with the bundle ID.

4. The apparatus of claim 3, wherein the IOMMU allows the memory operation to proceed upon a determination that the page access permissions associated with the bundle ID indicates that the memory operation is permitted.

5. The apparatus of claim 4, wherein the IOMMU blocks the memory operation upon a determination that the page access permissions associated with the bundle ID indicates that the memory operation is not permitted.

6. The apparatus of claim 3, further comprising translation tables.

7. The apparatus of claim 6, wherein the IOMMU uses the translation tables to validate the first request.

8. The apparatus of claim 6, wherein the IOMMU validates the first request while performs the lookup of the first table.

9. The apparatus of claim 1, wherein the IOMMU further comprises global page reference counters associated with each page of memory to track a magnitude of guest virtual addresses that reference each page.

10. The apparatus of claim 9, wherein the IOMMU further comprises a structure comprising a number of pages of memory assigned to each Bundle ID.

11. The apparatus of claim 10, wherein the IOMMU further comprises a structure comprising a list of the Bundle ID that each of a plurality of tenants may access.

12. The apparatus of claim 11, wherein the IOMMU further comprises device reference counters to track a magnitude of guest virtual addresses of tenants that can access each of the plurality of devices.

13. A method comprising:
receiving a request to perform a memory operation from a first of a plurality of devices;
performing a lookup of a first table using a host physical address (HPA) associated with a first physical page of memory included in the request to find a bundle ID associated with the HPA; and
performing a lookup of a second table using the bundle ID as an index to the second table to determine page access permissions associated with the bundle ID.

14. The method of claim 13, further comprising allowing the memory operation to proceed upon a determination that the page access permissions associated with the bundle ID indicates that the memory operation is permitted.

15. The method of claim 14, further comprising blocking the memory operation upon a determination that the page access permissions associated with the bundle ID indicates that the memory operation is not permitted.

16. The method of claim 15, further comprising validating the request via translation tables while performing the lookup of the first table.

17. At least one non-transitory computer-readable medium having instructions, which when executed by a processor, causes the processor to:
receive a request to perform a memory operation from a first of a plurality of devices;
perform a lookup of a first table using a host physical address (HPA) associated with a first physical page of memory included in the request to find a bundle ID associated with the HPA; and
perform a lookup of a second table using the bundle ID as an index to the second table to determine page access permissions associated with the bundle ID.

18. The computer-readable medium of claim 17, having instructions, which when executed by a processor, further causes the processor to allow the memory operation to proceed upon a determination that the page access permissions associated with the bundle ID indicates that the memory operation is permitted.

19. The computer-readable medium of claim 18, having instructions, which when executed by a processor, further causes the processor to block the memory operation upon a determination that the page access permissions associated with the bundle ID indicates that the memory operation is not permitted.

20. The computer-readable medium of claim 19, having instructions, which when executed by a processor, further causes the processor to validate the request via translation tables while performing the lookup of the first table.

* * * * *